April 6, 1954

W. D. MOEHRING 2,674,459

CODE DISK FOR RADIO SONDE

Filed Jan. 18, 1952

INVENTOR.
WILLIAM D. MOEHRING

BY

Ostrolenk & Faber

ATTORNEYS

Patented Apr. 6, 1954

2,674,459

UNITED STATES PATENT OFFICE 2,674,459

CODE DISK FOR RADIO SONDE

William D. Moehring, Charlotte, Mich., assignor to Wilcox-Gay Corporation, Charlotte, Mich., a corporation of Michigan Application January 18, 1952, Serial No. 267,163

1 Claim. (Cl. 274—42)

My present invention relates to radio sonde equipment and more particularly it relates to the code disks used in radio sonde equipment.

In radio sonde equipment, an arm carries a stylus which is adapted to track in coded grooves of a rotating disc, grooves at different distances from the center of the disc carrying different coded signals which may be translated by the stylus and apparatus connected thereto into electrical signals, the said signals then providing an indication of the deflection of the stylus and its arm. These electrical signals are then transmitted by radio to the monitor station where they are interpreted.

The stylus location is a function of an operating mechanism which may be connected, for example, to a temperature measurement device, to a pressure measurement device or a humidity measurement device; the signals are therefore interpreted in terms of temperature, pressure, humidity, or any other function or condition which the instrument to which the stylus arm is connected, is adapted to measure.

It is well known in the art that radio sonde equipment must be able to withstand great variations in temperature, humidity and pressure, temperature being the most important of these three factors. More specifically it is found that code disks used for radio sonde equipment very often are used at temperatures of −50° C. or less. It is found that when plastic coated metallic disks are used as code disks at these very low temperatures, they warp considerably, thus making their use in connection with the translating stylus a very problematic operation.

My present invention has overcome this problem by providing a metallic backing plate to the plastic disk assembly. My novel code disk consists of an aluminum disk with a plastic coating having an aluminum backing plate. The backing plate is generally square in shape and at each corner has crimped normally extending sections embedded into the back plate of the plastic code disk. The plastic disk itself has a central recess to which is secured a thin metallic disk. The backing plate has a centrally located annular flange normally extending into the recess of the code disk, the outer edge of the backing plate bearing against the code disk.

Accordingly the main object of my present invention is the provision of means whereby plastic disks can be made resistant to extreme temperature changes.

Another object of the present invention is the provision of means whereby existing code disks for radio sonde equipment can be made temperature resistant in a very economical way.

These and other objects of my incention will become apparent in the following description to be taken in connection with the drawings in which.

Figure 1:
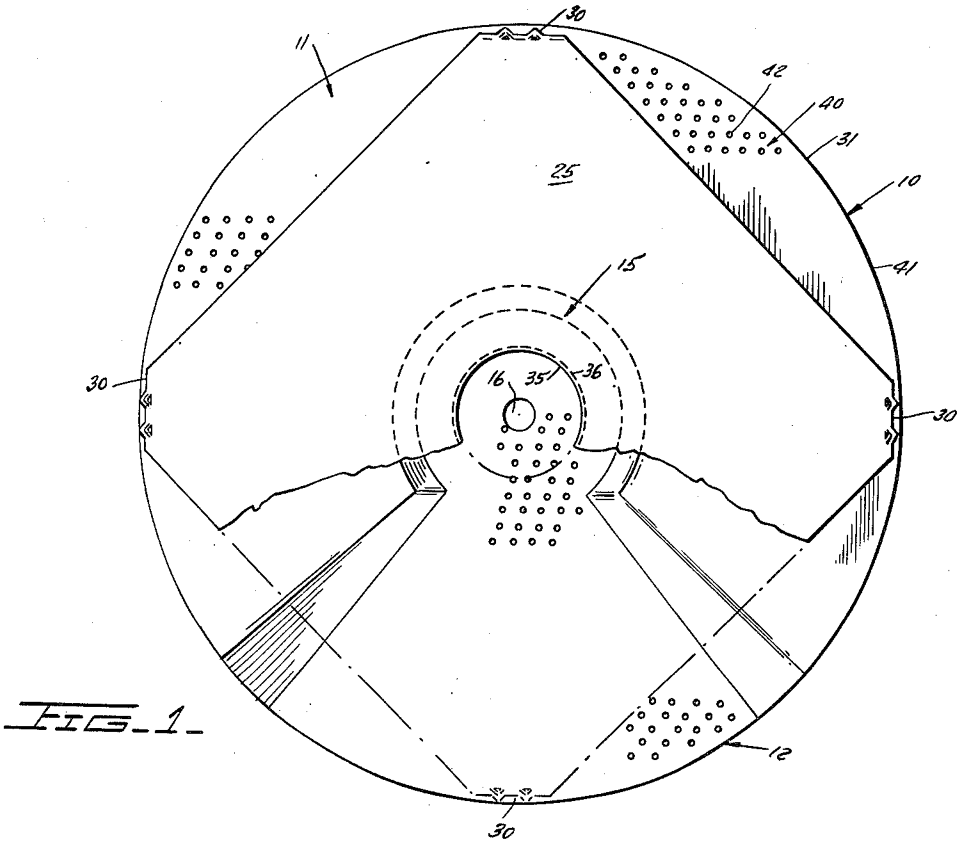
Figure 1 is the back view, partly broken away, of the code disk of my invention showing the backing plate.
Figure 2:
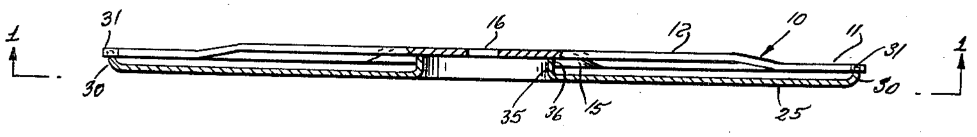
Figure 2 is a side view, partly broken away, of the code disk of my invention.

Referring now to Figures 1 and 2, code disk 10 is made of an aluminum perforated disk 40 coated with a plastic material 41. It is seen that the disk is very light weight since not only is aluminum a light metal but the aluminum disk 40 is in addition provided with perforations 42 to further decrease its weight. Perforations 42 serve also another purpose in that the plastic material 41 can overflow into perforations 42, thus making the aluminum disk 40 and its coating 41 a really integral member 10. Disk 10 is divided into two sections 11 and 12, section 12 being slightly raised in comparison to section 11. The raised section 12 is the code section of the disk, the coding being made before its use.

In radio sonde operation there are three different coded signals sent out: one representing temperature, a second representing pressure, and a third representing humidity. A disk such as disk 10 with different grooves in the raised section 12 is employed to control the signalling. One groove, for example, may represent a particular pressure, a second groove a different pressure, and so on.

When a stylus (not shown) engages one of those grooves it will produce electrical signals which, in code, will give the required information. We can say, therefore, that the code disk 10 serves to translate into electrical signals the location of a stylus with respect to the center of the disk 10.

Plastic disk 10 has a central opening 16 for positioning the same on the spindle of a turntable, not shown; the central area 15 of plastic disk 10 is raised to a height corresponding to the raised section 12. A metallic plate 25, preferably of aluminum because of its light weight, having an approximately square shape, is provided at each corner with crimped normally extending sections 30. Normally extending sections 30 are embedded by heat and pressure into the peripheral section 31 of plastic disk 10. Square backing plate 25 is provided also with a centrally located circular flange 35 extending toward central area 15 of disk 10. The outer edge 36 of flange 35 bears against disk 10 at this central area (see Figure 2).

The backing plate 25 is spaced from the disk 10 so that the combination of the backing plate 25 and disk 10 forms a truss.

Since this combination is a truss structure, it is easily seen that any attempt to warp the edges 31 of the disk 10 will be resisted by the backing plate 25 since its central flange 35 which bears against the disk 10 will produce a stress on the disk 10 opposing the warping action of the edges 31 by means of the crimped ends 30 of the backing plate 25, embedded in disk 10.

It is further noted that any attempt of the central portion of disk 10 to warp will produce stresses at the crimped embedded ends 30 of the backing plate 25 which are transmitted through the plate 25 to the annular flange 35, which in its turn will then oppose any warping of the central portion of disk 10.

By the addition of such a backing plate 25 it is therefore possible to produce a code disk having the characteristics of a truss structure, so that no warping can occur under severe temperature conditions.

In other words, this truss structure strengthens considerably disk 10 so that practically no warping can occur under extreme temperature variations.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claim.

I claim:

A code record for radio sonde equipment, said code record comprising a disk member having a raised segment with code grooves therein and a raised central portion, a backing plate, said backing plate having crimped ends, and a central circular flange, said crimped ends engaging said disk member, said circular flange extending into said central raised portion of said disk member in contact with said disk, said backing plate and said disk forming a truss resistant to temperature changes.

References Cited in the file of this patent

UNITED STATES PATENTS

| Number | Name | Date |
|---|---|---|
| 1,288,610 | Jones | Dec. 24, 1918 |
| 2,579,496 | Huston | Dec. 25, 1951 |
| 2,588,958 | Byrne | Mar. 11, 1952 |